(12) United States Patent
Kitayama et al.

(10) Patent No.: US 7,011,750 B2
(45) Date of Patent: Mar. 14, 2006

(54) WATER TREATMENT DEVICE

(75) Inventors: Naoki Kitayama, Moriguchi (JP);
Masaki Moriizumi, Moriguchi (JP);
Jun Hirose, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 119 days.

(21) Appl. No.: 10/236,029

(22) Filed: Sep. 4, 2002

(65) Prior Publication Data

US 2003/0062321 A1 Apr. 3, 2003

(30) Foreign Application Priority Data

Sep. 4, 2001 (JP) .............................. 2001-267182

(51) Int. Cl.
*C02F 1/461* (2006.01)
(52) U.S. Cl. ...................... 210/192; 210/205; 210/243; 204/661; 204/666
(58) Field of Classification Search ................ 210/903, 210/748, 198.1, 205, 206, 192, 143, 243; 204/660, 661, 666; 205/742, 743
See application file for complete search history.

(56) References Cited

U.S. PATENT DOCUMENTS

| | | | | |
|---|---|---|---|---|
| 3,542,657 A | * | 11/1970 | Mindler et al. ............. | 205/511 |
| 3,728,245 A | * | 4/1973 | Preis et al. ............... | 204/278.5 |
| 3,929,600 A | * | 12/1975 | Hiasa et al. ................ | 210/668 |
| 5,306,400 A | * | 4/1994 | Bradbury et al. ........... | 205/464 |
| 5,376,240 A | * | 12/1994 | Kaczur et al. ............. | 205/617 |
| 5,575,901 A | * | 11/1996 | Hulme et al. ............... | 205/413 |
| 5,614,078 A | * | 3/1997 | Lubin et al. ................ | 205/743 |
| 6,315,886 B1 | * | 11/2001 | Zappi et al. ................ | 205/701 |
| 6,531,050 B1 | * | 3/2003 | Waite ......................... | 205/742 |
| 2002/0056674 A1 | * | 5/2002 | Iseki et al. .................. | 210/143 |
| 2003/0052062 A1 | * | 3/2003 | Iseki et al. .................. | 210/748 |
| 2003/0168411 A1 | * | 9/2003 | Hiro et al. .................. | 210/748 |

FOREIGN PATENT DOCUMENTS

| | | | | |
|---|---|---|---|---|
| JP | 2000-051894 A | * | 2/2000 | |
| JP | 2000-117259 | | 4/2000 | |
| JP | 2000-317477 A | * | 11/2000 | |
| JP | 2001-252667 | | 9/2001 | |

* cited by examiner

*Primary Examiner*—Frank M. Lawrence
(74) *Attorney, Agent, or Firm*—Darby & Darby

(57) ABSTRACT

The object of the present invention is to provide a water treatment device in which temperature does not affect performance in nitrogen removal. Water circulates in a first anaerobic filter bed chamber 5, a second anaerobic filter bed chamber 10, a contact aeration chamber 14, a sedimentation chamber 19, and an electrolytic chamber 59 for phosphorus removal. The supernatant in sedimentation chamber 19 flows into a disinfection chamber 21 and is then sent to an electrolytic chamber 100 for nitrogen removal. An electrode pair is provided inside electrolytic chamber 100. Halogen ions present in the water are oxidized on the anode side. After halogen gas is generated, this gas reacts with water and generates hypohalous acid. On the cathode side, the nitrogen components in the water are converted to nitrate ions, and these nitrate ions are further converted to ammonium ions. The hypohalous acid and ammonium ions react, and the nitrogen components are converted to nitrogen gas by way of chloramine.

14 Claims, 16 Drawing Sheets

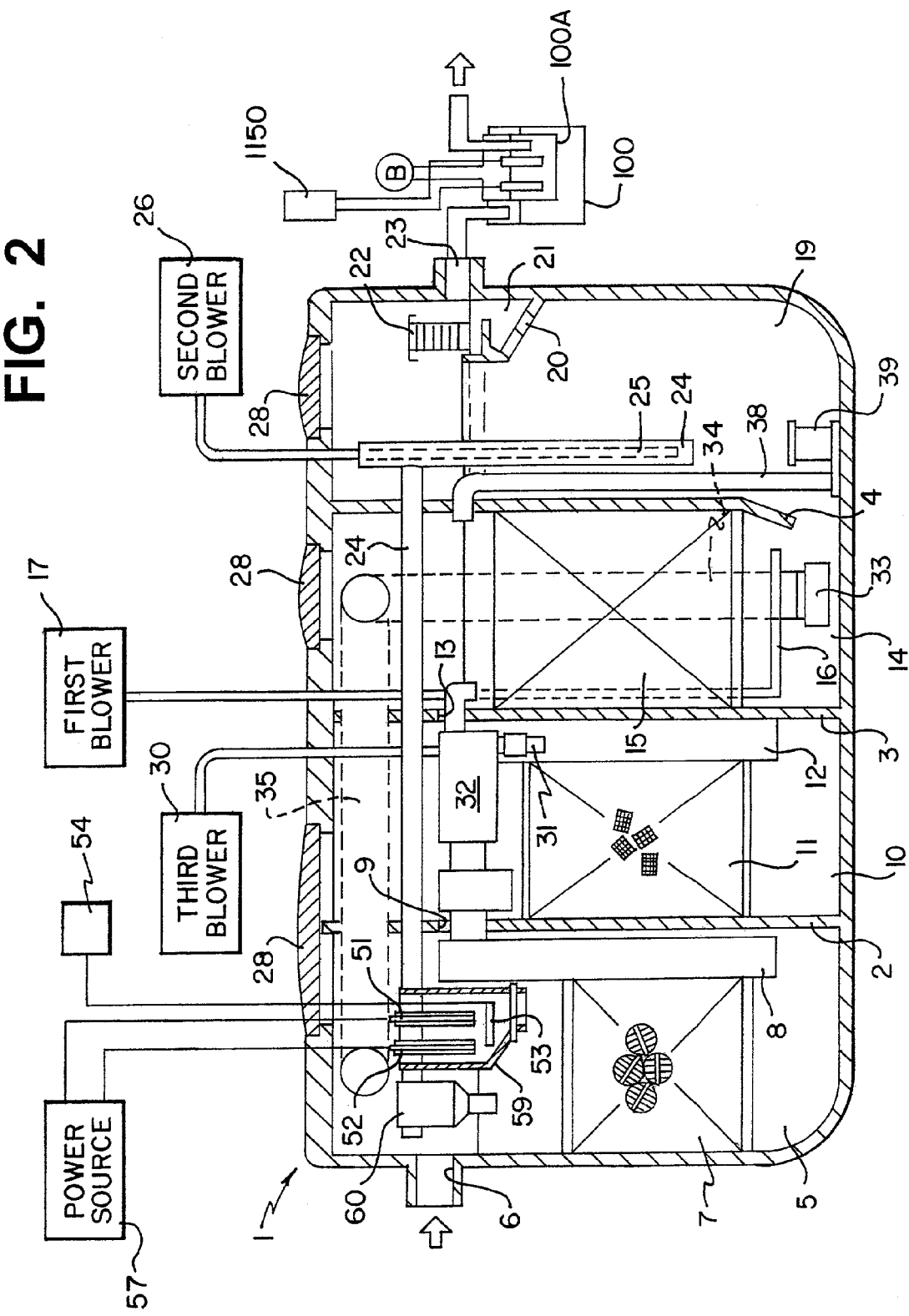

FIG. 7
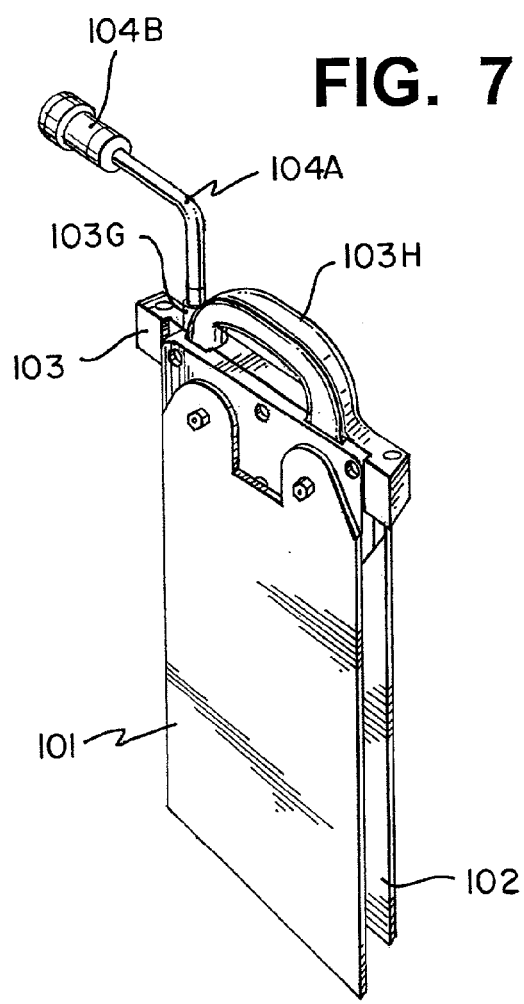
FIG. 9
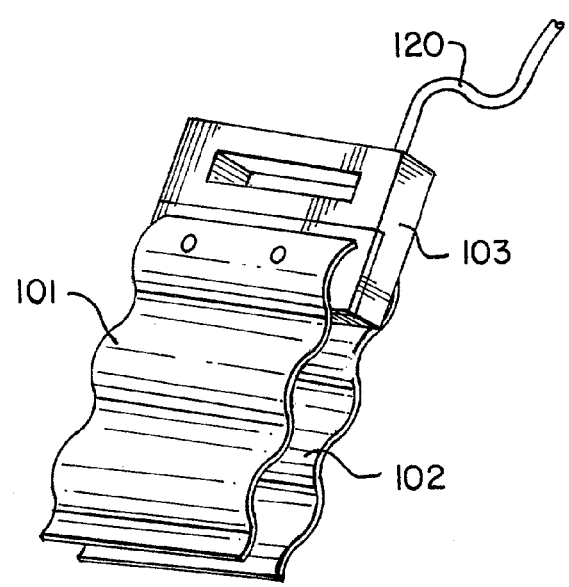
FIG. 8
FIG. 10
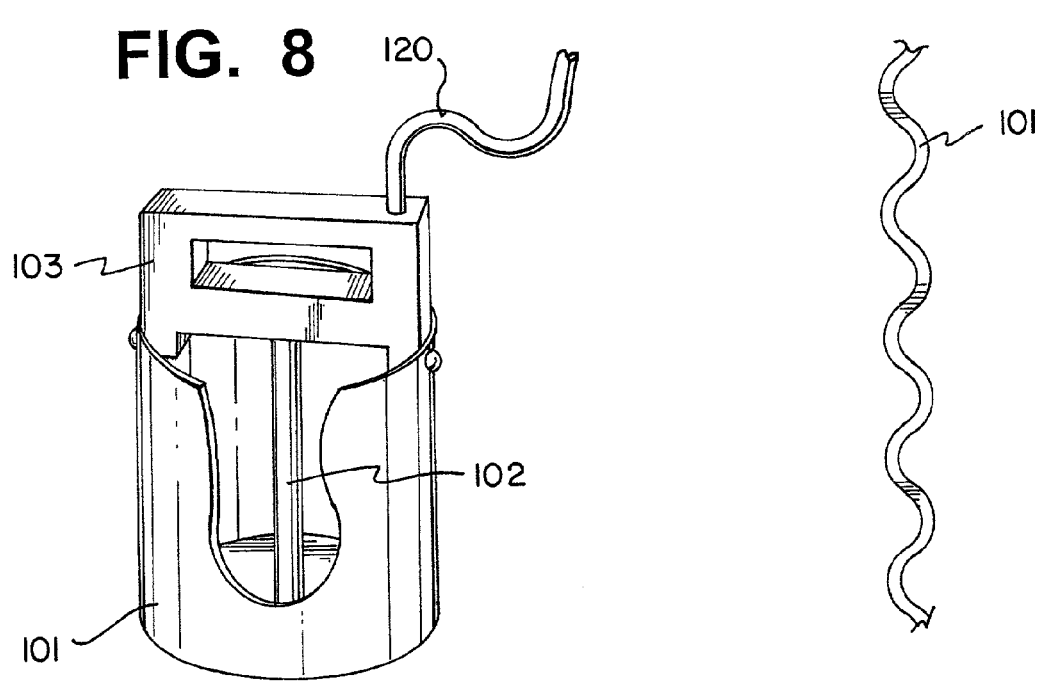

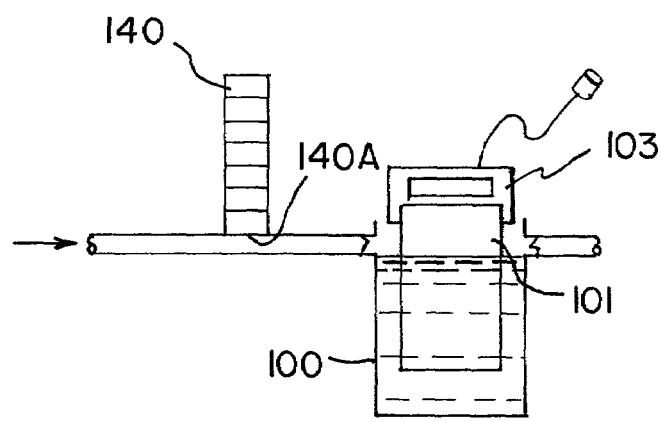
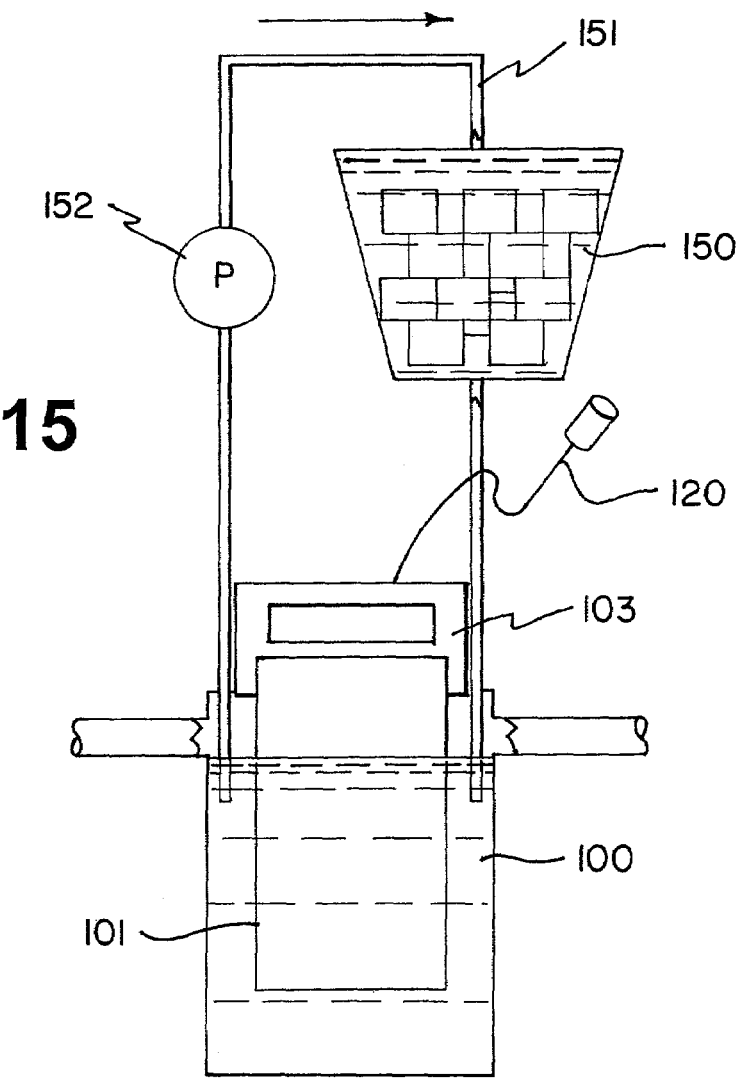

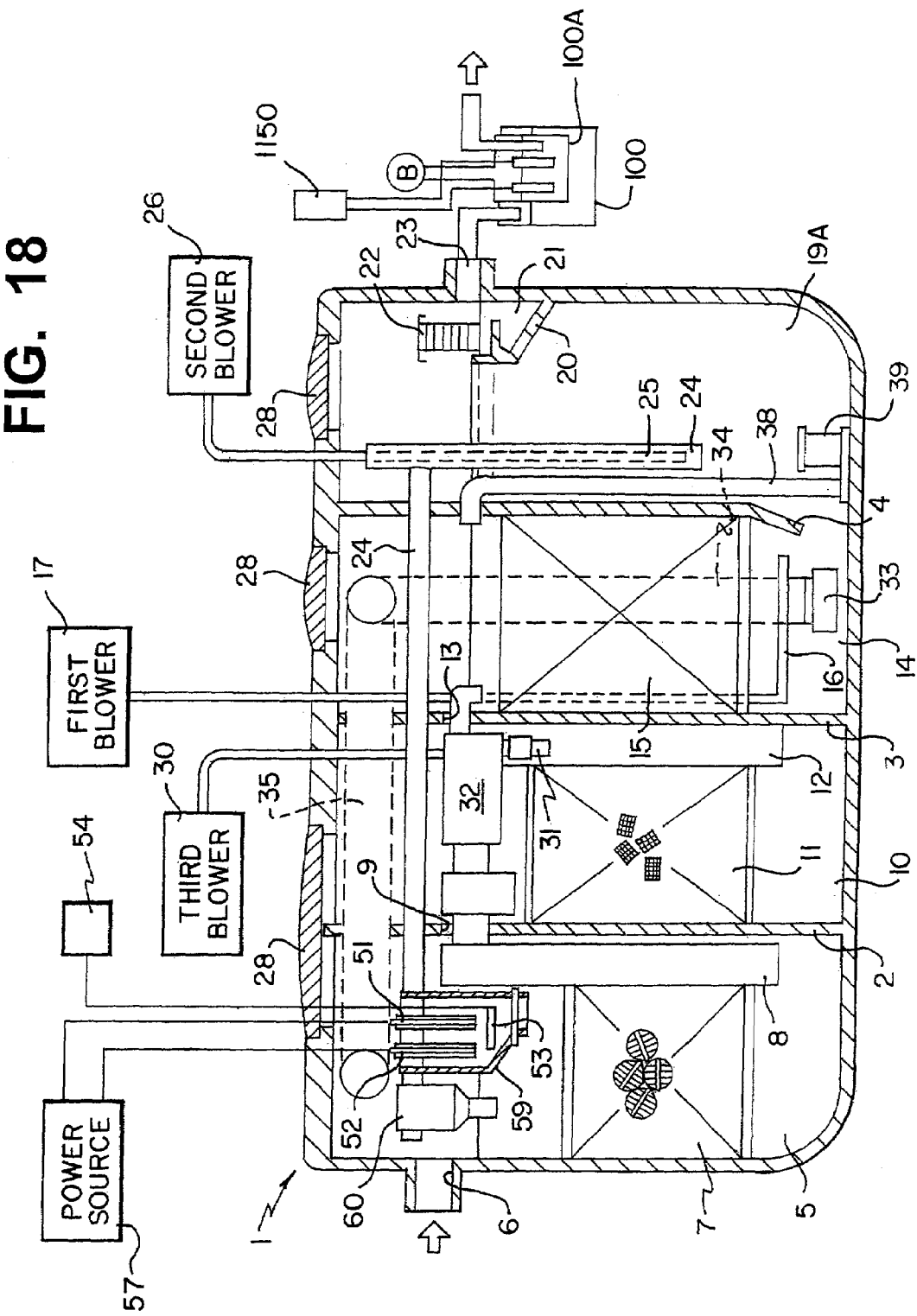

WATER TREATMENT DEVICE

BACKGROUND OF THE INVENTION

The present invention relates to a water treatment device. In particular, the present invention relates to a non-microbial water treatment device and method for removing nitrogen components in water.

In past water treatment devices, nitrogen components (organic nitrogen, nitrate nitrogen, nitrite nitrogen, ammonia nitrogen, and the like) in water such as factory waste water or ground water and the like were removed by microbial treatment.

However in such earlier devices, because the activity of the microbes is influenced by temperature, the effectiveness of the nitrogen component removal varied greatly between summer and winter. Another disadvantage of microbial treatment is that organic material (ethanol and the like) which acts as a hydrogen contributor is necessary. Consequently frequent maintenance is needed.

OBJECT AND SUMMARY OF THE INVENTION

The object of the present invention is to provide a water treatment device and method in which temperature does not affect nitrogen-removal performance.

The water treatment device according to one aspect of the present invention comprises a housing which houses water and an electrode pair for nitrogen treatment. The electrode pair is immersed in the water in the housing part and electrochemically treats nitrogen compounds such as organic nitrogen, ammonium ion, nitrate ion, nitrite ion and the like in the water.

According to an aspect of the present invention, reactions for removing nitrogen components (organic nitrogen, nitrate nitrogen, nitrite nitrogen, ammonia nitrogen and the like) from the water proceed at the electrode pair for nitrogen treatment. For example, the nitrogen components in the water are electrochemically converted to ammonium ion and the like at an electrode. The converted ammonium ion is further converted to nitrogen gas by reacting with the reaction products at another electrode.

Accordingly, with this water treatment device, nitrogen components in the water are removed electrochemically and without microbes. Therefore, the performance of this water treatment device does not vary with temperature.

Additionally, in the water treatment device according to the present invention, preferably, one of the pair of electrodes for nitrogen treatment comprises a conductive insoluble material, a conductive material coated with a conductive insoluble material, or carbon coated with a conductive insoluble material. The other of the pair of electrodes comprises a conductor containing at least one element from group Ib or IIb of the periodic table, iron, or a compound containing iron.

Accordingly, the efficiency of the reactions for nitrogen component removal is improved.

In the water treatment device according to the present invention, preferably one of the pair of electrodes comprises a conductor containing at least one element from group Ib or IIb of the periodic table, of iron or a compound containing iron and the other of the pair of electrodes comprises iron or a compound containing iron. Accordingly, in this water treatment device, when one electrode is the cathode, removal of nitrogen from the water is possible, and when the other electrode is the cathode, removal of phosphorus from the water is possible.

Additionally, in the water treatment device of the present invention, preferably, an electric potential controller controls the electric potential provided to the electrode pair and periodically reverses the polarities of the electrodes of the pair. Accordingly, the reaction occurring at the electrode surface changes periodically, and the creation of membranes and the like on top of the electrode surface is suppressed.

Additionally, the water treatment device according to the present invention further comprises an anchor which anchors the electrodes to the housing part. The anchor is preferably of unitary construction and has a terminal which is attached to the electrodes in order to connect the electrodes to a power source which supplies electric potential. Accordingly, the position of the terminal is anchored, and contact between the terminal and the water is prevented more reliably.

Furthermore, with the water treatment device according to the present invention, at least a portion of a wire that connects the electrodes to the power source is internal to the anchor. Accordingly, the wire is compactly located and is not immersed in water.

The water treatment device according to the present invention, can be used in conjunction with a traditional microbial treatment device. Water that has already been microbially treated can then be transferred into the housing of the present device. Accordingly, negative effects on the microbes in the microbial chamber due to acids such as hypochlorous acid and the like, which is thought to be generated in the electrode reactions, is avoided.

Additionally, with the water treatment device according to the present invention, the water can be treated in a disinfecting chamber where the water is disinfected after the above electrode treatment.

The present invention also contemplates processing water in the present device that has already had a secondary treatment.

The water treatment device according to the present invention may also comprise an ion supplying electrode pair which supplies metal ions by electrolysis. Accordingly, phosphorus components in the water may also be removed.

Preferably with the water treatment device according to the present invention, water in which metal ions have not yet reacted with the ion supplying electrode pair are brought into the housing.

The water treatment device according to the present invention preferably further comprises:

one or more inflow nitrogen compound ion quantity sensor which detects the total quantity of nitrogen compounds in the water brought into the housing; and an outflow nitrogen compound ion quantity sensor which detects the total quantity of nitrogen compound in the water discharged from the housing;

a current flow controller which controls the current flowing between the electrodes of the electrode pair based on the detection output of the inflow nitrogen compound ion quantity or the outflow nitrogen compound ion quantity. Accordingly, nitrogen components can be removed from the water more reliably.

The water treatment device according to the present invention may preferably comprise one or more of a compound quantity controller which controls the addition of a compound which provides halogen ions in the water based on the detection output of the inflow nitrogen compound ion quantity or the outflow nitrogen compound ion quantity.

The above, and other objects, features, and advantages of the present invention will become apparent from the following description read in conjunction with the accompanying drawings, in which like reference numerals designate the same elements.

BRIEF DESCRIPTION OF THE DRAWINGS

FIG. 2 is longitudinal section of a device useful in the water treatment system of FIG. 1.

FIG. 7 is a perspective view of a modification of the electrode pair of FIG. 4.

FIG. 8 is a perspective view of a modification of the electrode pair of FIG. 4.

FIG. 9 is a perspective view of a modification of the electrode pair of FIG. 4.

FIG. 10 is a side view of the electrode of FIG. 9.

FIG. 14 is an illustration of a modification of the structure of a storage part of the device of FIG. 3.

FIG. 15 is an illustration of modification of the structure of the storage part of FIG. 3.

FIG. 18 is an illustration of a modification of a tank of the device of FIG. 2.

DETAILED DESCRIPTION OF THE INVENTION

The present invention is described with reference to the Figures. The water treatment device is mainly used in large-scale waste water treatment facilities which treat household or factory waste water. However, the present invention can also be used in small to mid-scale wastewater treatment facilities such as a household combined purification tank or the like. In addition, with the present water treatment device, nitrogen compounds contained in household wastewater or wastewater from plating factories and the like can be removed by electrolytic treatment.

Figure 1:
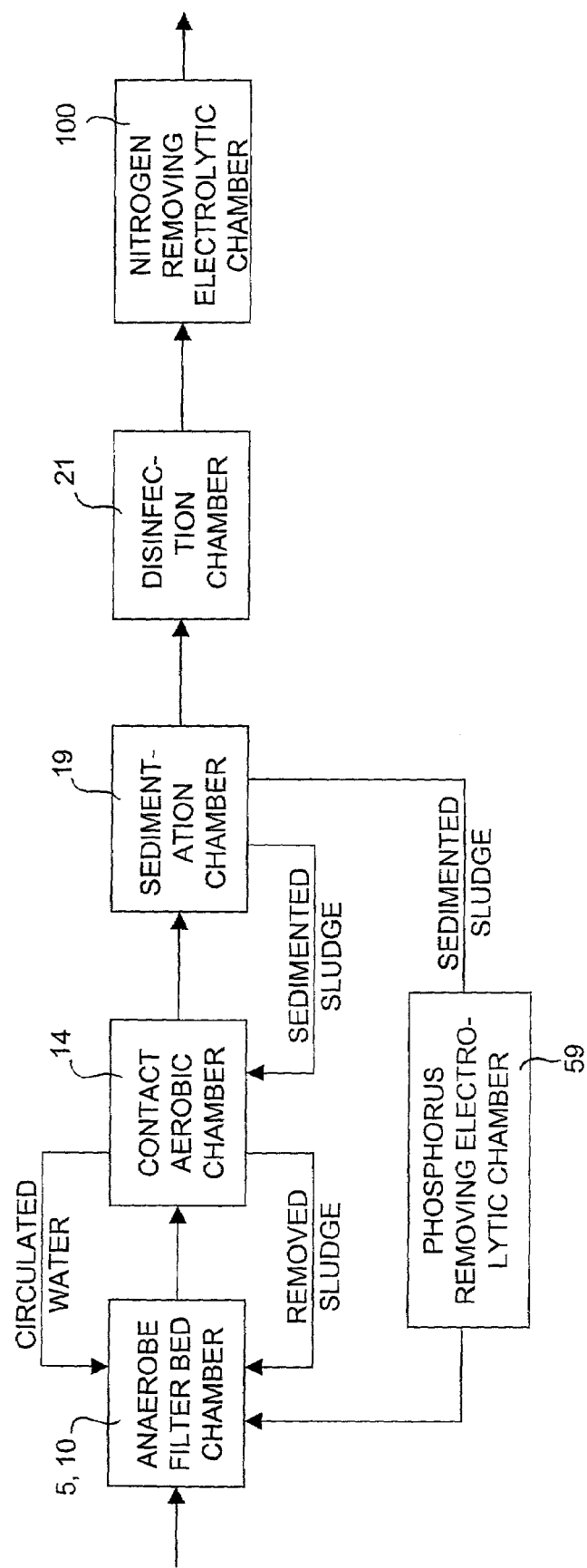
FIG. 1 is a flow chart of a water treatment process using a first embodiment of a water treatment device of the present invention.

FIG. 1, is a diagram of a water treatment process using a water treatment system containing a water treatment device of the present invention. FIG. 2 is a longitudinal cross section of a device of this system.

The water treatment system of the present invention includes a tank 1 and an electrolytic chamber 100. Tank 1 is buried in the ground. The interior of tank 1 is divided into a first anaerobic filter bed chamber 5, a second anaerobic filter bed chamber 10, a contact aeration chamber 14, a sedimentation chamber 19, and a disinfecting chamber 21 by, respectively, first 2, second 3, third 4, and fourth 20 partitioning walls. The upper part of tank 1 may be covered with a plurality of man hole covers 28. Parts inside tank 1 may be connected to parts outside of tank 1 such as, for example, a third blower 30 and the like. The parts outside of tank 1 such as the third blower 30 and the like are illustrated as being located above tank 1, but these parts may be located elsewhere, as well.

The first anaerobic filter bed chamber 5 is equipped with an inflow opening 6 through which miscellaneous household wastewater is introduced. A first anaerobic filter bed 7 is located inside the first anaerobic filter bed chamber 5. Accordingly, the first anaerobic filter bed chamber 5 may also serve as an impurity removal chamber. The first anaerobic filter bed chamber 5 may serve as the inflow chamber. In first anaerobic filter bed chamber 5, impurities which are not easily broken down in household wastewater are separated by sedimentation. Additionally, organic substances in the household wastewater are anaerobically decomposed by the anaerobic microbes of the first anaerobic filter bed 7. Nitrate nitrogen is also reduced to nitrogen gas here.

The first anaerobic filter bed chamber 5 may also be equipped with a first cross-flow pipe 8, and a first water supply opening 9 maybe formed on the upper portion of first partitioning wall 2. One end of first cross-flow pipe 8 is located inside first anaerobic filter bed chamber 5, and the other end is located inside second anaerobic filter bed chamber 10. The water that has been subjected to anaerobic decomposition at first anaerobic filter bed chamber 5 is supplied to second anaerobic filter bed chamber 10 via first cross-flow pipe 8.

Second anaerobic filter bed chamber 10 is equipped with a second anaerobic filter bed 11. Suspended matter is captured by second anaerobic filter bed 11, and organic material is anaerobically decomposed by anaerobic microorganisms. The nitrate nitrogen is reduced to nitrogen gas.

Second anaerobic filter bed chamber 10 is equipped with a second cross-flow pipe 12. Spray device 32 is also attached to the upper part of second cross-flow pipe 12. Spray device 32 is connected to third blower 30. Second anaerobic filter bed chamber 10 is connected with contact aeration chamber 14 through spray device 32, via a second water supply opening 13 which passes through the upper portion of second partitioning wall 3.

Spray device 32 blows out air, which received from, third blower 30, through spray opening 31 into second cross-flow pipe 12. As a result, the supply of treated water from second anaerobic filter bed chamber 10 to contact aeration chamber 14 through second cross-flow pipe 12 is accelerated.

Contact aeration chamber 14 is equipped with a contact material 15 which accelerates the culturing of aerobic microbes. A first diffuser pipe 16 is located near the bottom of contact aeration chamber 14.

The upper end of first diffuser pipe 16 is connected to a first blower 17. A plurality of holes is formed on the lower surface of first diffuser pipe 16. Air sent from first blower 17 is released as air bubbles from these holes. The presence of the holes on the lower surface of first diffuser pipe 16, reduces the likelihood of sludge entering diffuser pipe 16, as compared to if the holes were formed on the upper or side surface of first diffuser pipe 16.

The release of air bubbles from first diffuser pipe 16, assists in maintaining contact aeration chamber 14 in an aerobic condition. Therefore in contact aeration chamber 14, aerobic microbes aerobically decompose the treated water. Additionally, nitrification, takes places and ammonia nitrogen breaks down into nitrate nitrogen. Aerobic microbes inside contact aeration chamber 14 may include nitrification bacteria, which generally are ammonia oxidizing bacteria and nitrite forming bacteria.

A biological film, which gradually propagates and grows in size, is attached to contact material 15. The biological film attached to contact material 15 peels off of contact material 15 when bubbles are released from first diffuser pipe 16.

Pump 33 is located in the lower portion of contact aeration chamber 14. A sludge return path 34 is connected to pump 33 and preferably at the top of pump 33. A further sludge return path 35 is connected to the upper end of sludge return path 34 and extends towards the left of the figure. As a result, the sludge generated in contact aeration chamber 14 may first be sent to anaerobic filter bed chamber 5. The lower end of third partitioning wall 4 is not connected to the inner wall of tank 1, so that the bottoms of contact aeration chamber 14 and sedimentation chamber 19 are connected.

A disinfection chamber 21 is provided at the upper portion of sedimentation chamber 19. Disinfecting chamber 21 is constructed so that only the supernatant liquid of sedimentation chamber 19 flows into this disinfecting chamber 21. Furthermore, disinfecting chamber 21 is equipped with a microbiocidal device 22 which contains biocidal chemicals such as chlorine and the like. The treated water flowing into disinfecting chamber 19 is disinfected by these chemicals and is sent to electrolytic chamber 100 via a discharge opening 23. In addition, together with electrolytic chamber 100, there is also a storage area 111 and a pump 110 for supplying halogen ions to the electrolytic chamber 100 where nitrogen components are removed from the water. Electrolytic chamber 100 is separate from electrolytic chamber 59 which is described below.

Sedimentation chamber 19 is equipped with a third cross-flow pipe 38 through which the treated water inside contact aeration chamber 14 flows into sedimentation chamber 19. This flow may be accelerated by pump 39.

Sedimentation chamber 19 and first anaerobic filter bed chamber 5 are connected by a first return pipe 24 which contains a second diffuser pipe 25 in its interior. Second diffuser pipe 25 is connected to a second blower 26 and has spray holes for spraying air, which is supplied from second blower 26. The treated water inside sedimentation tank 19 is sent to first anaerobic filter bed chamber 5 via first return pipe 24.

Electrolytic chamber 59 is located in the upper portion of first anaerobic filter bed chamber 5. Water from first return pipe 24 is introduced into electrolytic chamber 59, which contains a pair of electrodes 51, 52, each of which is each connected to power source 57.

Metal ions such as iron ion, aluminum ion or the like elute inside electrolytic chamber 59, by an electrolytic reaction at electrode pair 51 and 52. The eluted metal ions, the phosphorus compounds, and the like in the water react inside electrolytic chamber 59, and insoluble metal salts are generated and aggregate. For example, when iron ion elutes as the metal ion, insoluble metal salts such as $FePO_4$, $Fe(OH)_3$, $FeOOH$, $Fe_2O_3$, and $Fe_3O_4$ are formed and aggregate.

The water inside electrolytic chamber 59 may flow into magnetic treatment unit 60 installed downstream of electrolytic chamber 59. Here, the water comes into contact with a magnet. The aggregate created by supplying iron ions to the water which, for example contains $Fe_3O_4$, are attracted to the magnet. As a result, $FePO_4$, which aggregates with $Fe_2O_3$ and $Fe_3O_4$, is also attracted to the magnet and is separated from the water.

After treatment with magnetic treatment unit 60, the water is again sent to first anaerobic filter bed chamber 5.

Again, referring to FIG. 1, after treatment by first anaerobic filter bed chambers 5 and second anaerobic filter bed chamber 10, the water is sent to contact aeration chamber 14 and then to sedimentation chamber 19. The water in sedimentation chamber 19, together with the sludge sediment, is returned to first anaerobic filter bed chamber 5 through electrolytic chamber 59. The water, together with the sludge sediment, flows from sedimentation chamber 19 to contact aeration chamber 14. The water and the sludge from contact agent 15, also flows from contact aeration chamber 14 to second anaerobic filter bed chamber 10. The supernatant of the water inside sedimentation chamber 19 flows into disinfecting chamber 21. The water inside disinfecting chamber 21 is sent to electrolytic chamber 100 via discharge opening 23.

Figure 3A:
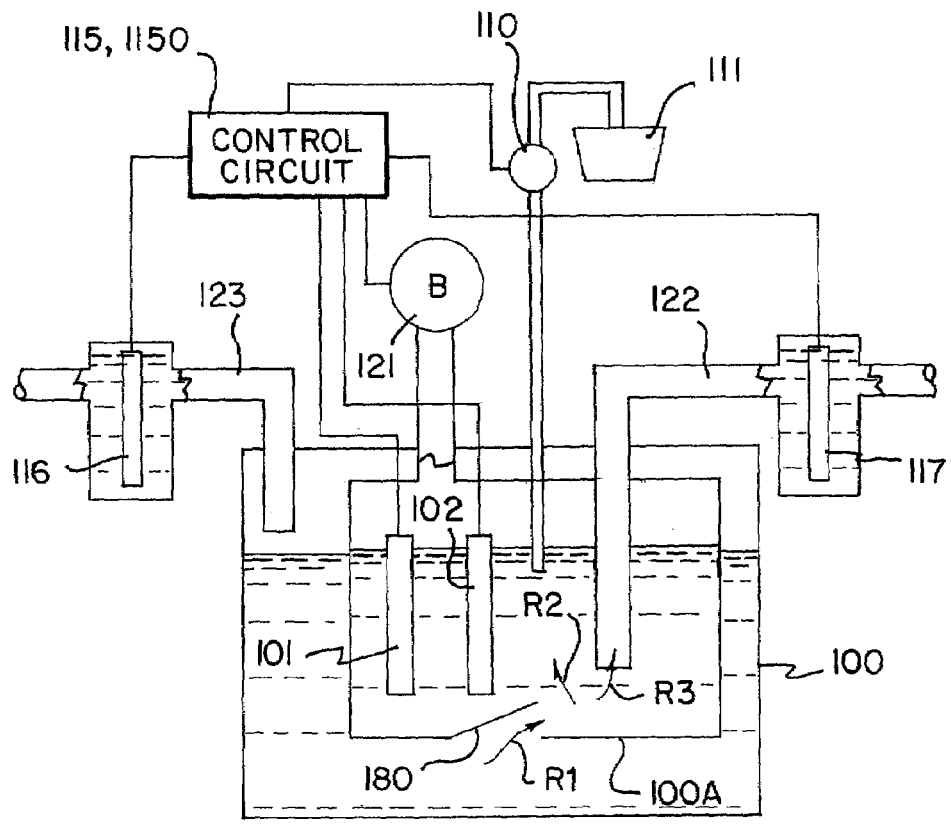
FIG. 3(A) is an illustration of an electrolytic chamber of the device of FIG. 1.

The construction of an electrolytic chamber 100 is described with reference to FIG. 3(A).

The water is introduced into electrolytic chamber 100 by an incoming pipe 123. Furthermore, the water is discharged from electrolytic chamber 100 by an exit pipe 122.

A nitrogen removal chamber 100A is housed inside electrolytic chamber 100. The water inside electrolytic chamber 100 is introduced into nitrogen removal chamber 100A and immerses two electrodes 101, 102 which form an electrode pair for nitrogen treatment. Electric potential is provided to electrodes 101, 102 from a power source 1150 in a control circuit 115.

An ion concentration meter 116 is located upstream of electrolytic chamber 100, and an ion concentration meter 117 is located downstream. Ion concentration meters 116 and 117 detect the total amount of nitrogen ions. Their outputs are directed to control circuit 115.

A compound (sodium chloride and the like), typically in fluid form, such as liquid or the like and which provides halogen ions in aqueous solution, is provided in nitrogen removal chamber 100A from storage unit 111 via a pump 110. This compound is stored in storage part 111. The halogen ion is consumed in a nitrogen removal reaction inside nitrogen removal tank 100A. The amount of halogen ion providing compound added from storage unit 111 is controlled by control circuit 115 and is based on the detection output of ion concentration meters 116, 117. The amount of this halogen providing compound increases as the total amount of nitrogen-based ions increases.

Figure 3B:
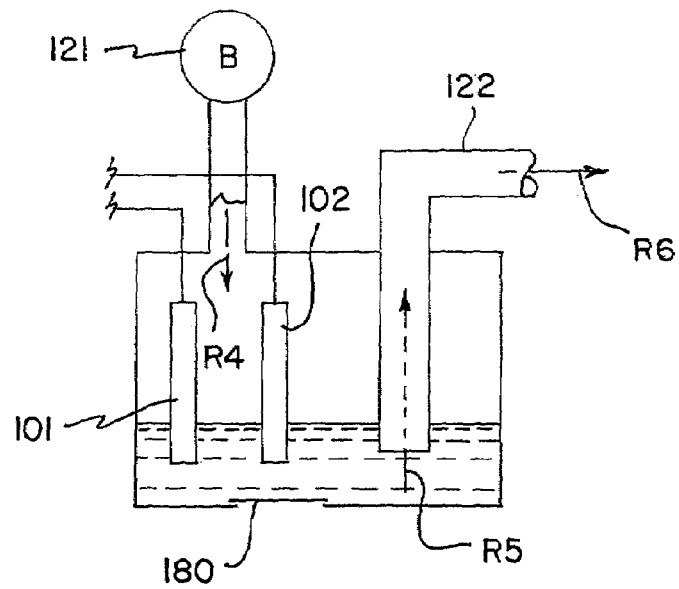
FIG. 3(B) is an illustration of the nitrogen removal chamber of FIG. 3(A).

Referring to FIG. 3(B) nitrogen removal chamber 100A is equipped at its bottom with a valve 180 and a blower 121 for sending air to the interior of nitrogen removal chamber 100A is provided. The air blowing action of blower 121 is controlled by control circuit 115. Air is directed inside nitrogen removal chamber 100A by blower 121 when power is not supplied. This results in an increase in air pressure inside nitrogen removal chamber 100A. When the air pressure inside nitrogen removal chamber 100A reaches a predetermined level, valve 180 closes and the water inside nitrogen removal chamber 100A is discharged via discharge pipe 122. FIG. 3(B) illustrates valve 180 closed, and water flow with valve 180 closed is indicated by arrows R4, R5, and R6.

After a predetermined time, the air flow from blower 121 ceases, which results in a reduction of air pressure inside nitrogen removal chamber 100A. Valve 180 is then released, and water is brought into nitrogen removal chamber 100A from electrolytic chamber 100. The supply of power to electrodes 101, 102 is also started or restarted by having the pressure inside nitrogen removal chamber 100A lowered. FIG. 3(A) illustrates valve 180 open, and the flow of water with valve 180 open is shown by arrows R1, R2, and R3. This condition is maintained for a predetermined time, and results in the removal of nitrogen by the reactions that occur near electrodes 101, 102.

This cycle may repeat as often as necessary. Accordingly, substances that are generated by the electrochemical reaction at electrodes 101, 102 are reliably supplied to the water, and the nitrogen components in the water are reliably removed. Because water is efficiently circulated near electrodes 101, 102, the nitrogen components in the water are efficiently removed.

Blower 121, which is controlled to blow air intermittently in this manner, acts as an intermittent constant volume pump.

Control circuit 115 can control the amount of current flowing between electrodes 101, 102 based on the detection output from ion concentration meters 116, 117. The amount of current flowing between electrodes 101, 102 is increased as the total amount of nitrogen ions increase.

Figure 4:
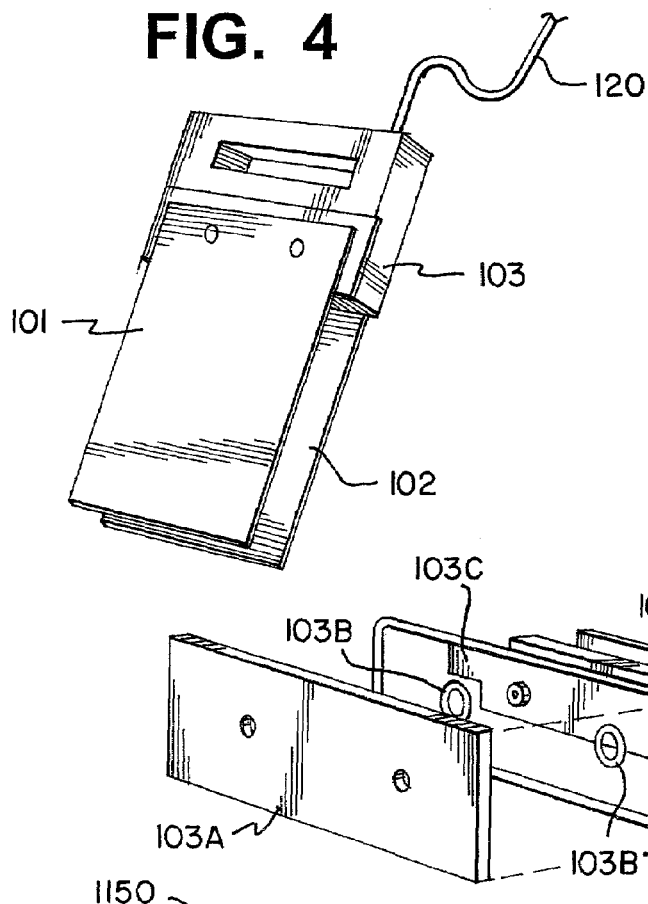
FIG. 4 is a perspective view of an electrode pair of FIG. 3.

Referring to FIG. 4, electrodes 101 and 102 which comprise the electrode pair are attached to a support piece 103. A wire 120, which connects electrodes 101, 102 to control circuit 115, extends from the top part of support piece 103.

Figure 5:
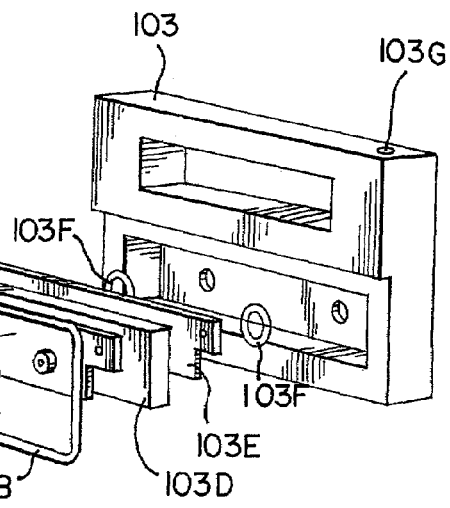
FIG. 5 is a perspective exploded view of a support piece of FIG. 4.

Referring to FIG. 5, a cover 103A, a packing 103B, a metal plate 103C, an insulator 103D, a metal plate 103E, a packing 103F are layered in that order in the interior of support piece 103. A hole 103G for passing through wire 120 is located on the top surface of support piece 103. Wire 120 is equipped with two terminals on its end, and is inserted inside support piece 103 via hole 103G. The two terminals are each electrically connected to metal plates 103C and 103E, thereby providing a section of wire 120 inside support piece 103.

On the front side of support piece 103, electrode 101 is electrically connected and affixed to metal plate 103C through cover 103A and packing 103B by metal screws or the like. On the reverse side of support piece 103, electrode 102 is electrically connected and affixed to metal plate 103E through the reverse surface of support piece 103 and packing 103F.

Metal plates 103B and 103E are insulated by insulator 103D. Accordingly, even when wire 120 is inside support piece 103, electrodes 101 and 102 are insulated. Support piece 103 itself is preferably constructed from an insulating material, and insulates electrodes 101 and 102.

Support piece 103 supports electrodes 101 and 102 at a constant distance when the electrodes are attached to the front and reverse sides of support piece 103, thereby avoiding any short circuit which would result from contact between electrodes 101 and 102.

Figure 6:
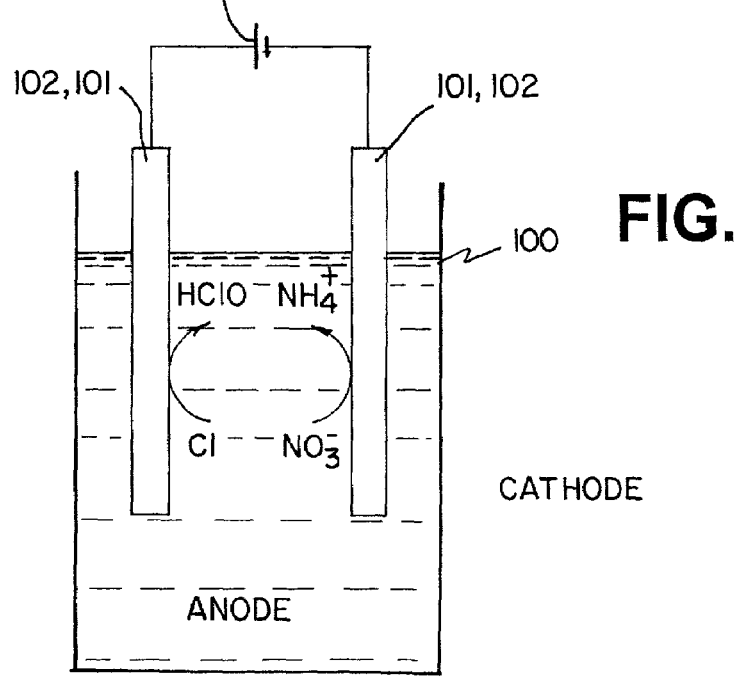
FIG. 6 is an illustration of the reaction in the electrolytic chamber of the device of FIG. 1.

Referring to FIG. 6, electrodes 101 and 102 are electrified by power source 1150 in control circuit 115. When one of electrodes 101 or 102 is electrified as a cathode electrode and the other as an anode electrode, the halogen ions (chloride ions in FIG. 6) present in the water are oxidized and halogen gas (chlorine gas if a chloride ion is oxidized) is generated on the anode side. This gas then reacts with water and produces hypochlorous acid. On the cathode side, the nitrogen components in the water (organic nitrogen compounds and the like in the water) are converted into nitrate ions, and the nitrate ions are further converted into ammonium ions. The hypochlorous acid and ammonium ion generated react to convert the nitrogen components into nitrogen gas by way of chloramine. The nitrogen components in the water are thereby electrochemically converted into nitrogen gas inside electrolytic chamber 100, and removed from the water.

The halogen providing compound stored in storage unit 111 (or in storage units 140, 150 described below) is preferably a compound that can supply hypochlorite ions such as hypochlorous acid or hypochlorite or the like for these reactions.

One of electrodes 101 or 102 preferably comprises an insoluble material that is conductive, a conductive material coated with this insoluble material, carbon coated with this insoluble material, or the like. Electrodes constructed in this manner assist in converting organic nitrogen components in the water to nitrogen gas by electrolytic treatment. This conductive insoluble material preferably is a conductive material containing at least one element from group Ib or IIb in the periodic table. This results in improved efficacy of the reaction relating to the nitrogen components on the cathode side of electrodes 101 and 102.

Electrodes 101, 102 should be electrified so that they have opposite polarities. It is preferable to have control circuit 115 periodically reverse its polarities, however, in order to avoid having the same reactions proceed on electrodes 101 and 102 and to avoid the accumulation of a film of reaction by-products on electrodes 101 and 102.

The other of electrodes 101 or 102 is preferably constructed from iron or a compound containing iron (an alloy containing iron) so that one of electrodes 101 or 102 is a cathode electrode. The reactions relating to nitrogen removal proceed on this electrode. Again, when the polarities of electrodes 101 and 102 are switched, the other electrode (iron or iron containing compound) becomes the cathode electrode, where reactions relating to phosphorus removal can proceed. Accordingly, the electrochemical removal of both nitrogen and phosphorus is possible with only electrolytic chamber 100.

The other of electrodes 101 and 102 can alternatively comprise the conductive, insoluble material or the carbon electrode as described above.

The electrode which will be the anode preferably comprises a substance that has an oxidation catalytic action such as platinum, titanium oxide, or the like, or is coated with such a substance. This accelerates the halogen ion oxidation reaction, which proceeds on the anode side.

As shown in FIGS. 4 and 5, the terminal for connecting electrodes 101 and 102 to wire 120 within support piece 103.

However, as shown in FIG. 7, this terminal can also be external and integral to support piece 103. In this embodiment, a tube 104A is affixed to hole 103G of support piece 103. A terminal 104B is attached to the end of tube 104A. A wire that electrically connects electrodes 101 and 102 to terminal 104B is passed through tube 104A. Tube 104A is constructed from a material, such as plastic or the like, that can anchor terminal 104B to support piece 103. Electrodes 101 and 102 and power source 1150 are easily connected in this manner.

The reactions at the anode and cathode electrodes inside electrolytic chamber 100 proceed at different speeds. The reaction at the cathode electrode is believed to be slower than the reaction at the anode electrode. Therefore, it is preferable that the electrode with the slower reaction has a larger surface area than the electrode with the faster reaction. One such example is shown in FIG. 8. In the electrode pair shown in FIG. 8, electrodes 101 and 102 are concentric cylinders with different radii and, therefore, different surface areas Electrode 101 is preferably the cathode electrode, and electrode 102 is preferably the anode electrode. Because the electrodes are cocentrically arranged, the surfaces of electrodes 101 and 102 are equally spaced apart over their entire lengths. Therefore, the products created at both electrodes can react uniformly in the interior of electrode 101.

In order to improve the reaction efficiency at electrodes 101 and 102, it is preferable that the surfaces of these electrodes are not smooth and are uneven in order to increase their surface area. FIGS. 9 and 10 illustrate this. As shown in FIGS. 9 and 10, electrodes 101 and 102 are corrugated sheets and are attached to support piece 103. The side surface(s) of electrode(s) 101 and/or 102 has a wave-like conformation. This unevenness can be provided in a micro scale by providing electrodes 101 and/or 102 with a porous surface or the like.

Figure 11:
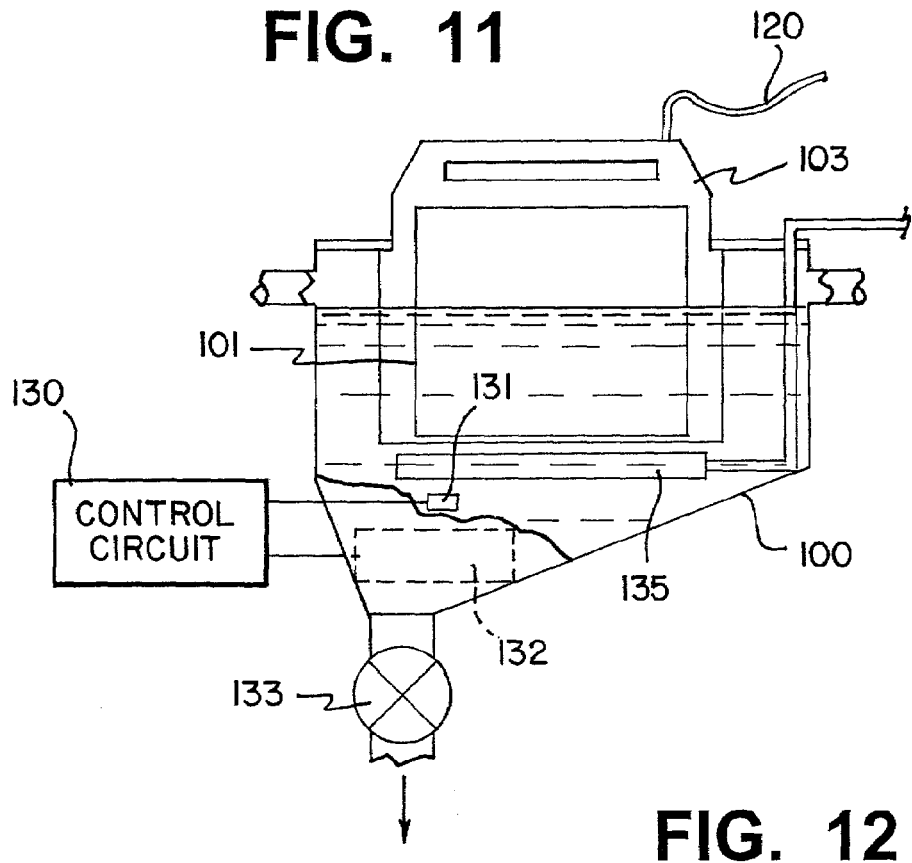
FIG. 11 is an illustration of a modification of the structure of the electrolytic chamber of the device of FIG. 1.

Sludge can accumulate inside electrolytic chamber 100 and inhibit the reaction at electrodes 101 and 102. Electrolytic chamber 100 may preferably be equipped with a mechanism for removing this sludge from electrodes 101 and 102, and/or a mechanism for discharging the sludge in order to overcome this. This is illustrated in FIG. 11. Here an ultrasonic oscillator device 132, a sludge quantity sensor, and a diffuser pipe 135 are provided inside electrolytic chamber 100. A valve 133 is also provided at the bottom of electrolytic chamber 100. Diffuser pipe 135 is connected to a pump (not shown) and is installed in the bottom portion of electrodes 101 and 102. Air bubbles are released upward from the bottom of electrodes 101 and 102, thereby pulverizing and removing the attached sludge. Ultrasonic oscillator 132 and sludge quantity sensor 131 are connected to control circuit 130. The ultrasonic oscillator 132 generates ultrasonic waves, which pulverize sludge hardened at the bottom of electrolytic chamber 100.

Other mechanisms for pulverizing and removing sludge attached to electrodes 101 and 102 and for pulverizing sludge at the bottom of electrolytic chamber 100 include, for example, a stirring rod inside electrolytic chamber 100, or a magnetized stirring piece which is constructed from a magnet and has a rotating motion or the like as a result of fluctuations in an external magnetic field.

Sludge quantity sensor 131 detects when the sludge inside electrolytic chamber 100 reaches a predetermined amount. The detection output of sludge quantity sensor 131 is sent to control circuit 130. When the sludge reaches the predetermined amount, control circuit 130 opens valve 133 automatically and the sludge is discharged. Control circuit 130 can alternatively be designed so that when the sludge reaches a specified amount, an operator is alerted by a report, signal, or the like, and valve 133 is opened manually. Sludge quantity sensor 131 may preferably be constructed from a sensor that detects conductivity, for example, whereby a change in the conductivity of the water due to sludge quantity in the water is detected.

Figure 12:
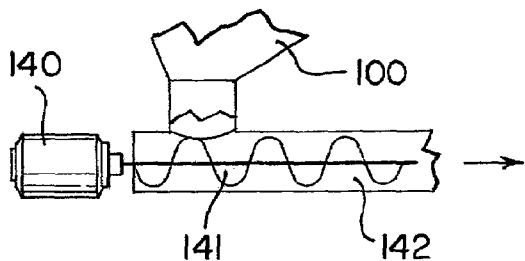
FIG. 12 is an illustration of a modification of the structure of the electrolytic chamber of the device of FIG. 1.

FIG. 12 illustrates a modification of electrolytic chamber 100, a transport pipe 142 is connected to the bottom part of electrolytic chamber 100. A screw 141 is installed inside transport pipe 142. Screw 141 is connected to a motor 140 and is rotatable. By rotating screw 141, the sludge accumulated at the bottom of electrolytic chamber 100 is transported to the outside of electrolytic chamber 100 (towards the right in FIG. 12), thereby avoiding the accumulation of sludge at the bottom of electrolytic chamber 100.

Figure 13:
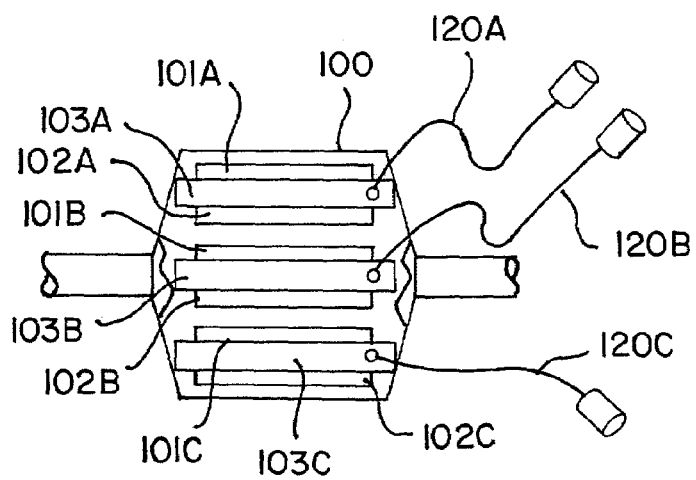
FIG. 13 is an illustration of a modification of the structure of the electrolytic chamber of the device of FIG. 1.

Another modification of electrolytic chamber 100 is shown in FIG. 13 in which a plurality of electrode pairs is located inside electrolytic chamber 100. For example, three sets of electrodes 101A, 102A, 101B, 102B, 101C, 102C may be attached to support pieces 103A, 103B, 103C. Wires 120A, 120B, 120C connected to power source 1150 may also be attached to support pieces 103A, 103B, 103C. By increasing the number of electrode pairs inside electrolytic chamber 100, the nitrogen component treatment quantity per unit time is increased.

With the embodiment described with FIG. 3, in order to accelerate the nitrogen removal reaction described in FIG. 6, a compound which supplies halogen ions to the solution in electrolytic chamber 100 is injected. As can be seen in FIG. 6, the halogen ion is used in the reaction at the anode electrode. Therefore, it is preferable to inject the compound that supplies halogen ions to the anode electrode side.

The compound stored in storage unit 111 preferably is in a fluid form, but may be in a solid form such as a pellet, or the like. Referring to FIG. 14, a storage unit 140, which stores the compound in solid form, is located upstream of electrolytic chamber 100 in the course of water to electrolytic chamber 100. A hole 140A is formed in the storage unit 140 at its bottom portion surface which faces the water. The compound inside storage unit 140 is introduced into electrolytic chamber 100 by the water which flows to electrolytic chamber 100 and can be added continuously to electrolytic chamber 100 without using a device such as a pump or the like.

In FIG. 15, the compound is stored in a storage unit 150. A watercourse 151 circulates the water from electrolytic chamber 100 inside storage unit 150 and returns it to electrolytic chamber 100. A pump 152 is attached to watercourse 151, which brings the water from electrolytic chamber 100 into storage unit 150 and then sends the water from inside storage unit 150 to electrolytic chamber 100. The compound inside storage unit 150 is thereby added to electrolytic chamber 100 by the water that flows into electrolytic chamber 100. The addition amount of the compound inside storage unit 150 may be controlled by controlling the actions of pump 152.

Figure 16:
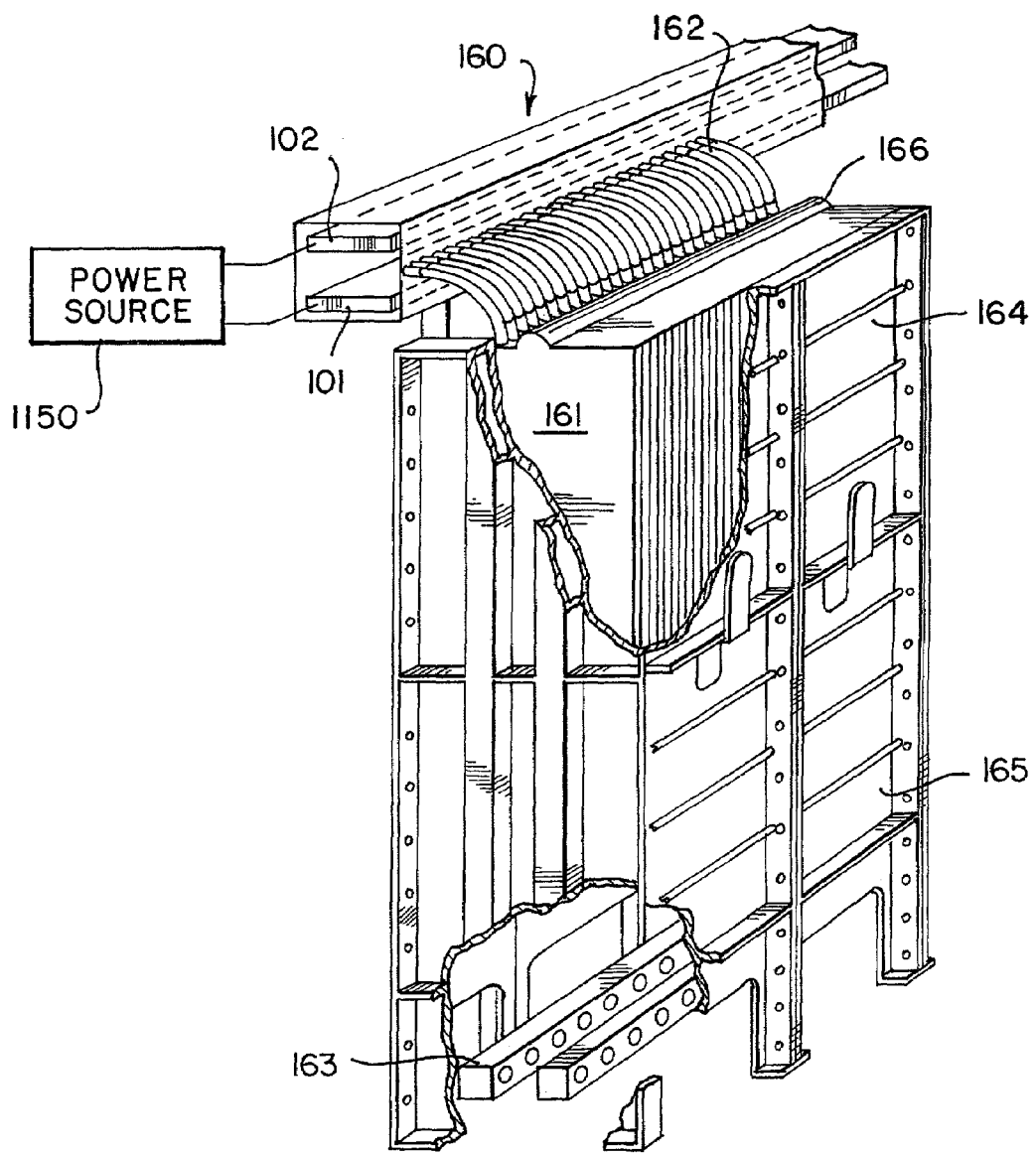
FIG. 16 is an illustration of a mechanism for supplying water, which has already passed through a membrane provided upstream of the electrodes of FIG. 3, to the electrodes.

FIG. 16 illustrates an alternative method for avoiding the attachment of sludge to the surface of electrodes 101 or 102, in which water which has passed through a specified membrane can be supplied to electrodes 101 and 102. Water that has been passed through a membrane which is located upstream from electrodes 101 and 102 is supplied in between electrodes 101 and 102. Electrodes 101 and 102 are located inside a collecting pipe 160. A cylindrical membrane cartridge 161 in which a membrane 166 of hollow fiber filter or the like is located upstream from electrodes 101 and 102 in the interior of collecting pipe 160. A diffuser pipe 163 having holes on its side surface is located on the lower part of membrane cartridge 161. The upper part of the perimeter of membrane cartridge 161 is surrounded by membrane case 164, and the lower part of its perimeter is surrounded by diffuser case 165. Collecting pipe 160 and membrane cartridge 161 are connected by a plurality of tubes 162. One end of each tube 162 is passed inside collecting pipe 160, and the other end faces membrane 166. After passing through membrane 166, the water brought inside membrane cartridge 161 is pushed up by the bubbles released from diffuser pipe 163 and is introduced inside collecting pipe 160 via tubes 162. Electrodes 101 and 102 are located along the inner wall of collecting pipe 160. As a result, the flow of water inside collecting pipe 160 is not obstructed by electrodes 101 or 102.

The length and shape of collecting pipe 160 can be adjusted so that the water can be retained for the amount of time necessary for the chain of reactions at electrodes 101 and 102. When nitrogen is to be removed from water, it is preferable to construct collecting pipe 160 so that a water retention time of at least around one hour is ensured.

Any or all of mechanisms for removing/pulverizing sludge as described in FIG. 11, transporting sludge as described in FIG. 12, passing the water through a plurality of electrode pairs as described in FIG. 13, and storage units 140 and 150 as described in FIGS. 14 and 15 can also be installed along with the sludge removal system of FIG. 16.

Accordingly, water may be treated following the flow shown in FIG. 1. Because the water is treated with electrolytic chamber 59 for phosphorus removal and electrolytic chamber 100 for nitrogen removal, the phosphorus components and the nitrogen components in the water are removed. As described in FIG. 6, in electrolytic chamber 100, compounds such as hypochlorous acid and the like which can inhibit the activity of microbes are generated in the reaction process. Because of this, electrolytic chamber 100, which is used for nitrogen removal, is preferably located after microbial treatment (i.e., after treatment with biological filtration chambers, activated sludge chambers, carrier fluid treatment chambers, including anaerobic filter bed chambers 5 and 10 and contact aerobic chamber 14).

Although removing nitrogen removing electrolytic chamber 100 may be located downstream from phosphorus removing electrolytic chamber 59, its location may be varied. Electrolytic chamber 100 can be installed upstream from phosphorus removal treatment as long as it is downstream of microbial treatment areas.

Tank 1 and electrolytic chamber 100 as described above are mainly used in large-scale wastewater treatment facilities that treat household wastewater or industrial wastewater. However, electrolytic chamber 100 can be installed as a later stage for a draw pump for ground water or purified water in order to remove nitrogen components from these waters.

Electrolytic chamber 100 may also be installed as a stage after tank 1 so that water that has had secondary treatment can be passed through electrolytic chamber 100.

Figure 17:
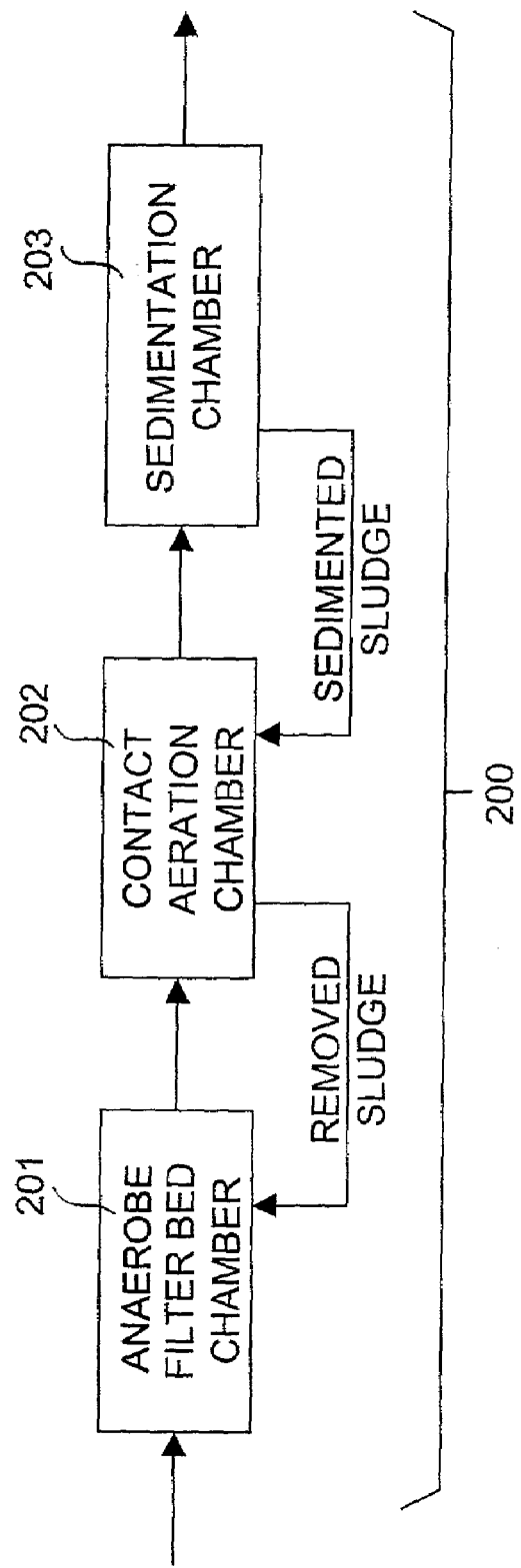
FIGS. 17(A), 17(B), and 17(C) are an illustration of a modification of the treatment process of FIG. 1.
Figure 17:
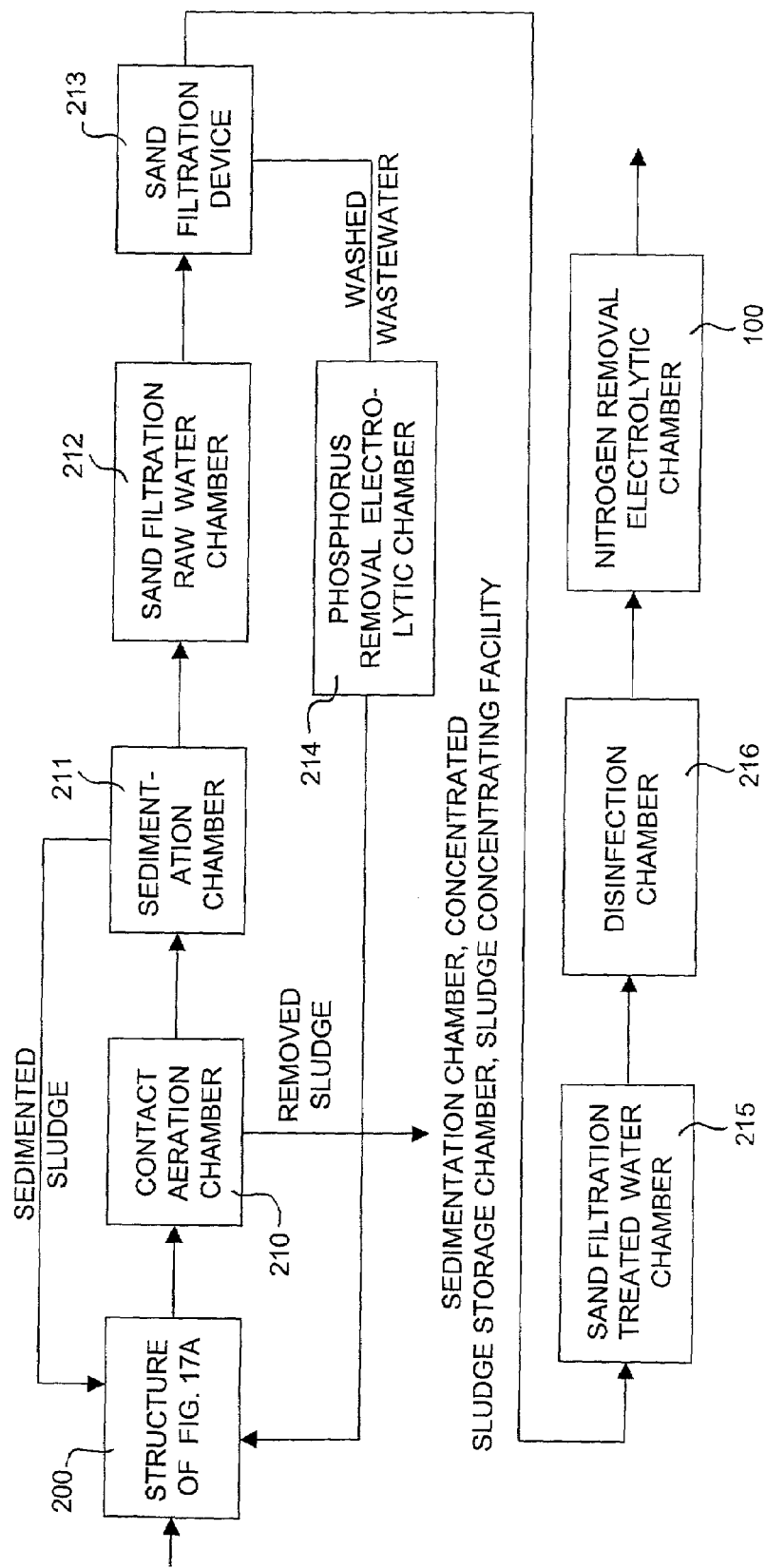

FIGS. 17(B), (C) illustrate a treatment sequence in which electrolytic chamber 100 is used for tertiary treatment of the water. Here, in process 200, the water is treated anaerobically and aerobically. Referring to FIG. 17(A), the water treated in anaerobic filter bed chamber 201 is sent to contact aeration chamber 202. After treatment in contact aeration chamber 202, a portion of the water, together with removed sludge, is returned to anaerobic filter bed chamber 202, and a portion is sent to sedimentation chamber 203. With the water inside sedimentation chamber 203, one portion, together with sedimented sludge, is returned to contact aeration chamber 202, but a second portion is sent to the next process.

Referring to FIG. 17(B), after treatment in process 200, the water is sent to contact aeration chamber 210. The treated water in contact aeration chamber 210 is sent to sedimentation chamber 211. The removed sludge in contact aeration chamber 210 is sent to a separate sedimentation chamber, concentrated sludge storage chamber, sludge concentrating facility or the like. One portion of the water in sedimentation chamber 211, together with sedimented sludge, is sent to anaerobic filter bed chamber 201 (refer to FIG. 17(A)), and a second portion is sent to sand filtration device 213 after being sent to a sand filtration raw water chamber 212. The washed wastewater generated by sand filtration device 213 is sent to electrolytic chamber 214 for phosphorus removal, and then is returned to anaerobic filter bed chamber 201 (refer to FIG. 17(A)). The water after treatment in sand filtration device 213 is sent to sand filtration treated water chamber 215 and is then disinfected in disinfecting chamber 216. After nitrogen removal in electrolytic chamber 100, the water is released.

Figure 17C:
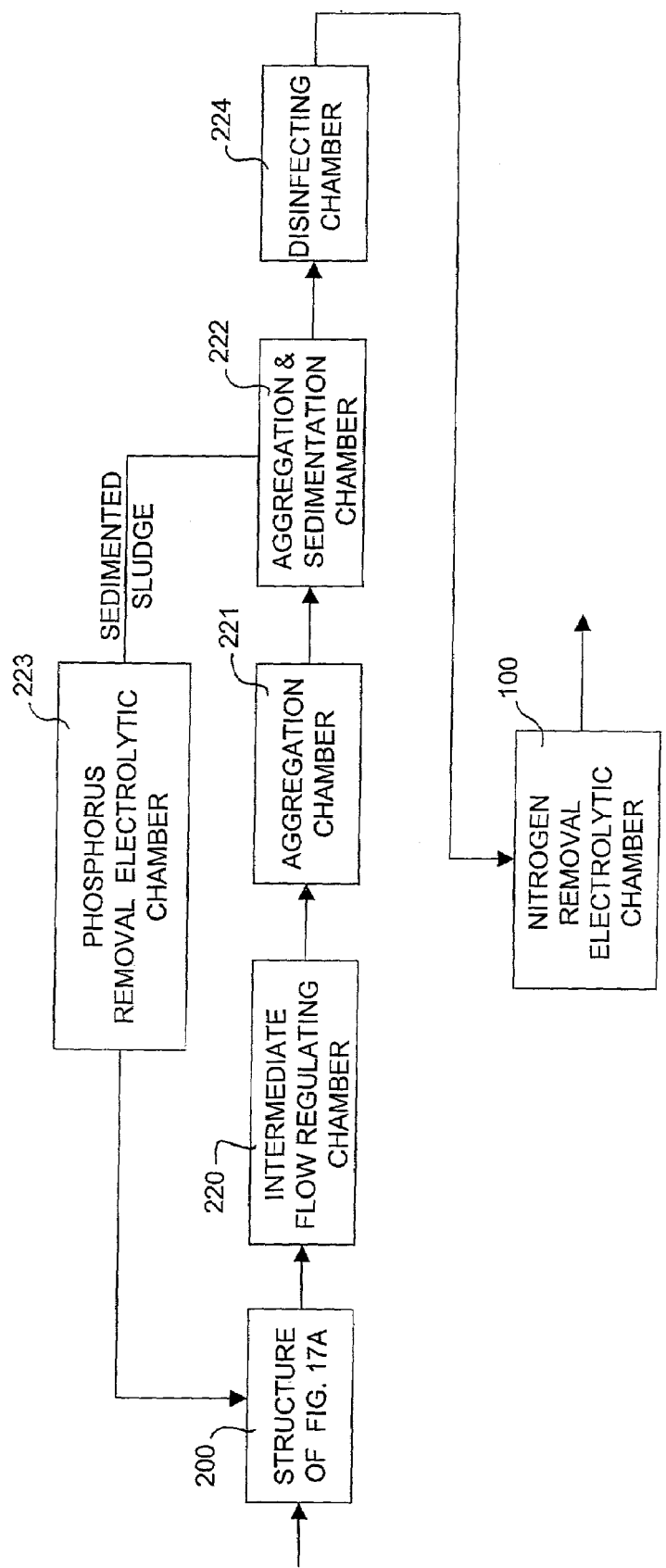

FIG. 17(A) and FIG. 17(C), illustrate another embodiment in which the water is treated both anaerobically and aerobically in process 200. The water after treatment with process 200 is circulated in intermediate flow regulating chamber 220, aggregation chamber 221, aggregation and sedimentation chamber 222, and phosphorus removal electrolytic chamber 223. The water from electrolytic chamber 223 that has been treated to remove phosphorus is sent to anaerobic filtration bed chamber 201 in process 200. The supernatant inside aggregation and sedimentation chamber 222 is sent to disinfecting chamber 224, is then treated in electrolytic chamber 100 to remove nitrogen, and is then released.

With the embodiments described above, electrolytic chamber 100 and nitrogen removal chamber 100A are used as tertiary treatment systems of tank 1 in which aerobic microbial treatment is conducted in contact aeration chamber 14. However, the present invention is not limited to this. Referring to FIG. 18, electrolytic chamber 100 and nitrogen removal chamber 100A can be used for tertiary treatment of tank 1 in which aerobic microbial treatment is conducted in biological filtration chamber 14A instead of contact aeration chamber 14.

Tank 1 shown in FIG. 18 is provided with a treated water chamber 19A instead of sedimentation chamber 19. Furthermore, with tank 1 shown in FIG. 18, partitioning wall 4A, replaces third partitioning wall 4 of FIG. 1. The lower end of third partitioning wall 4A is connected to the inner wall of tank 1, and contact aeration chamber 14A and water chamber 19A are not connected at their bottom portions.

Figure 19:
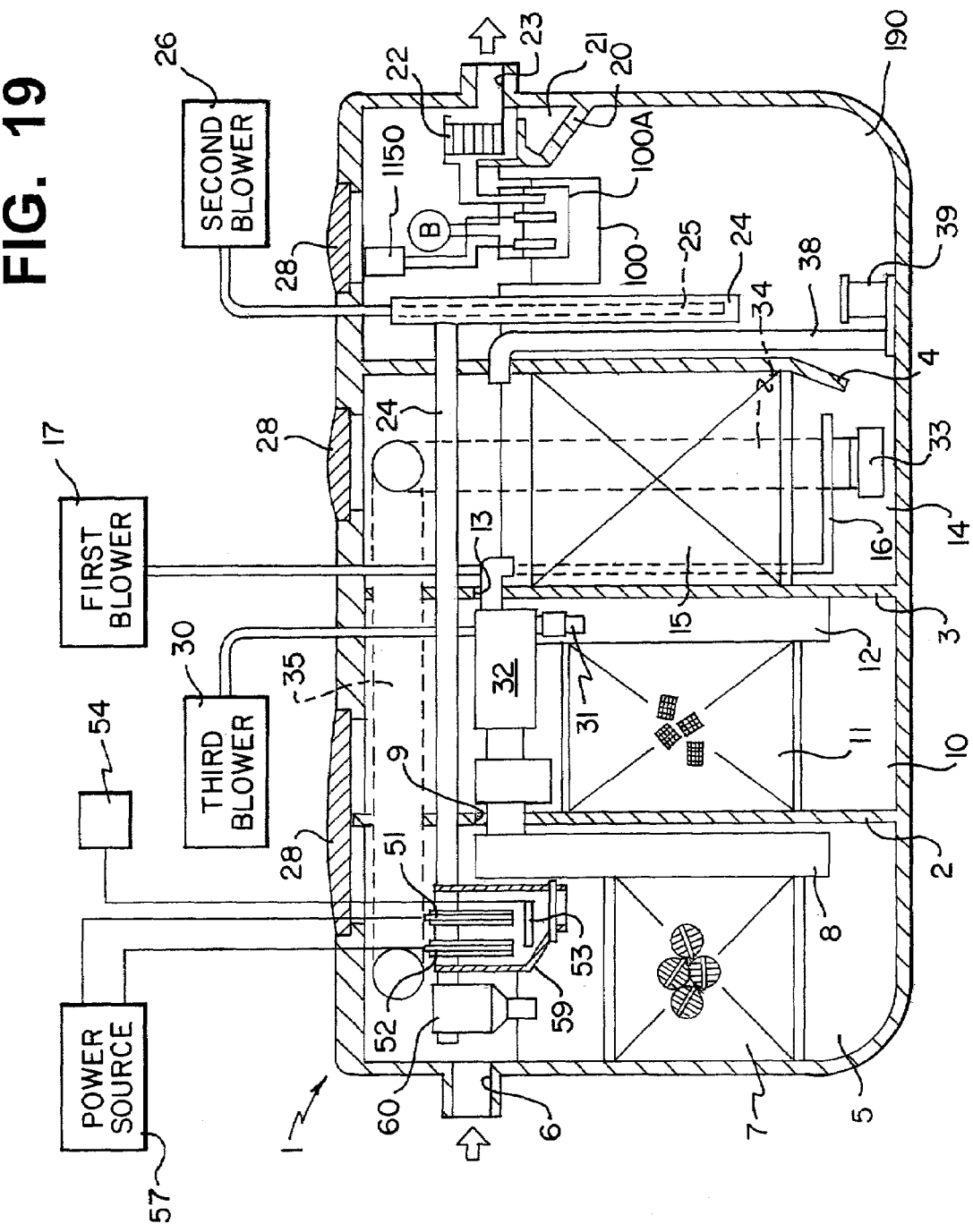
FIG. 19 is an illustration of a modification of the tank of the device of FIG. 2.

Additionally, electrolytic chamber 100 and nitrogen removal chamber 100A are provided as tertiary treatment systems in a later stage of tank 1. However, this can also be used as part of a secondary treatment inside tank 1. As described above, the substances contained in the water treated by electrolytic chamber 100 may inhibit the activity of microbes. Therefore, as shown in FIG. 19, electrolytic chamber 100 is preferably located in sedimentation chamber 190. With tank 1 in FIG. 19, nitrogen removal is conducted in sedimentation chamber 190. Accordingly, the devices for phosphorus removal and nitrogen removal can be compact. With the tank 1 shown in FIG. 19, sedimentation chamber 19 of tank 1 shown in FIG. 2 becomes sedimentation tank 190 by adding electrolytic chamber 100 and nitrogen removal chamber 100A.

When electrolytic chamber 100 and nitrogen removal chamber 100A are located inside tank 1 as shown in FIG. 19, the mechanisms described herein for removing sludge from inside electrolytic chamber 100 and from the surfaces of electrodes 101, 102 as described with FIG. 11 and the like are particularly effective.

Figure 20A:
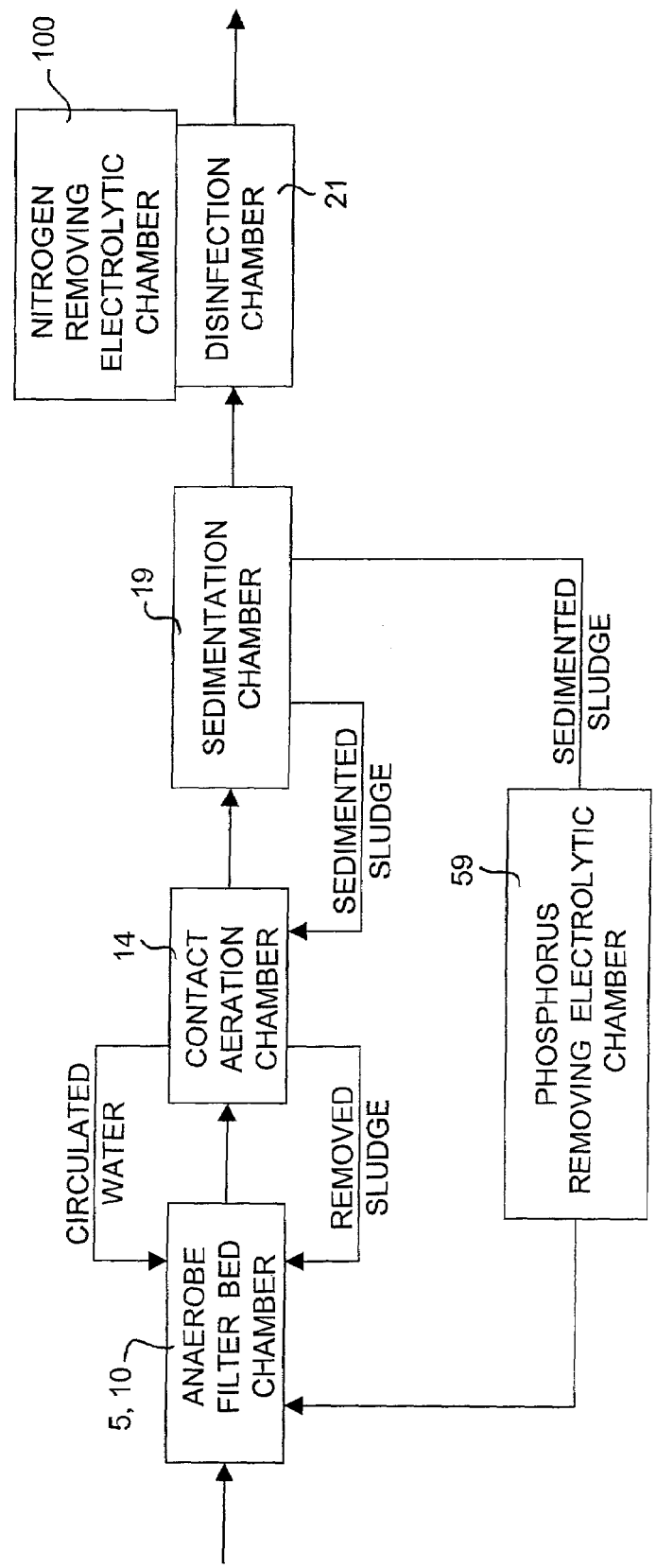
FIGS. 20(A), 20(B), and 20(C) are an illustration of a modification example of the treatment process of FIGS. 1, 17(B), and 17(C).
Figure 20B:
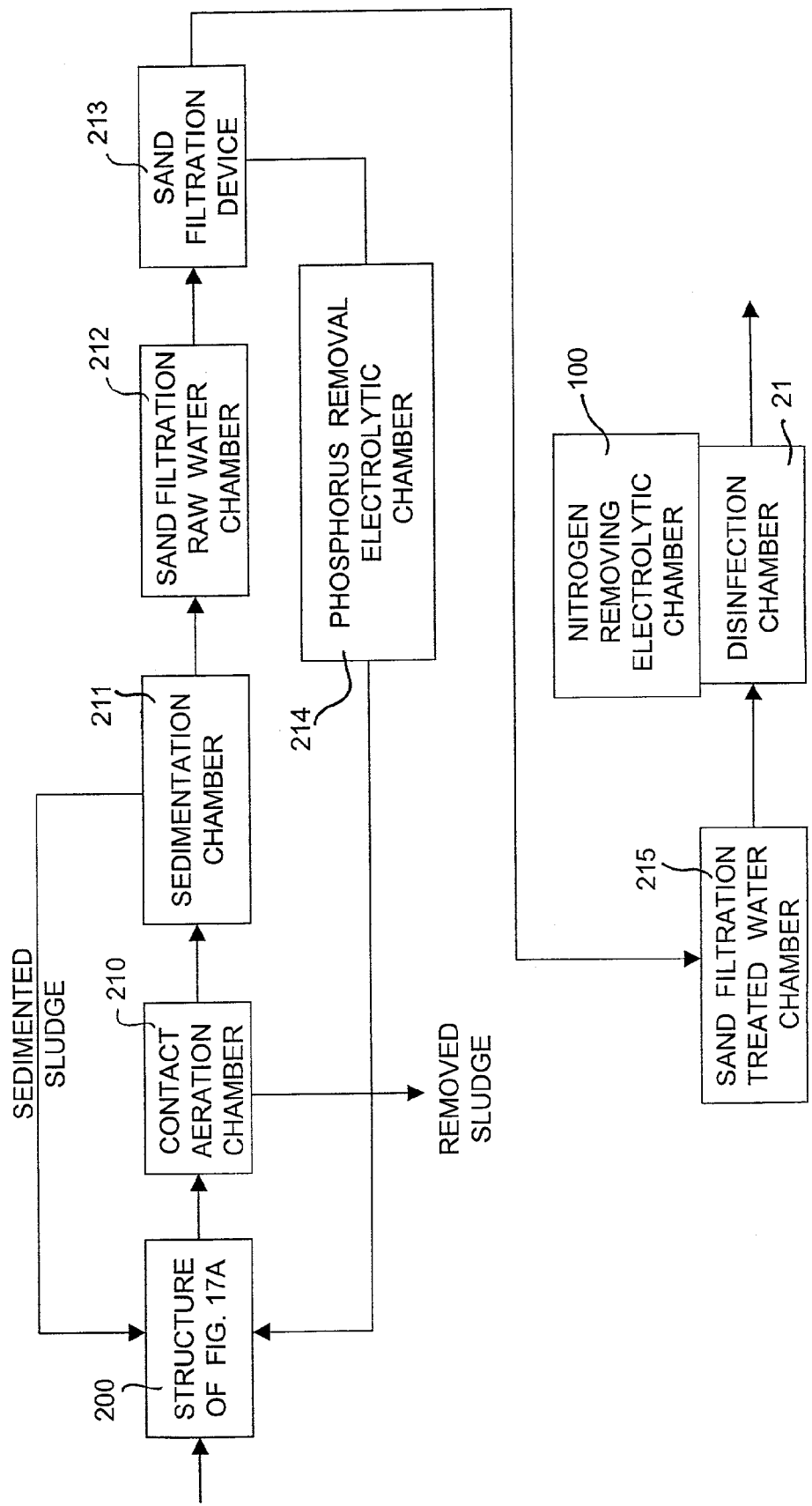
Figure 20C:
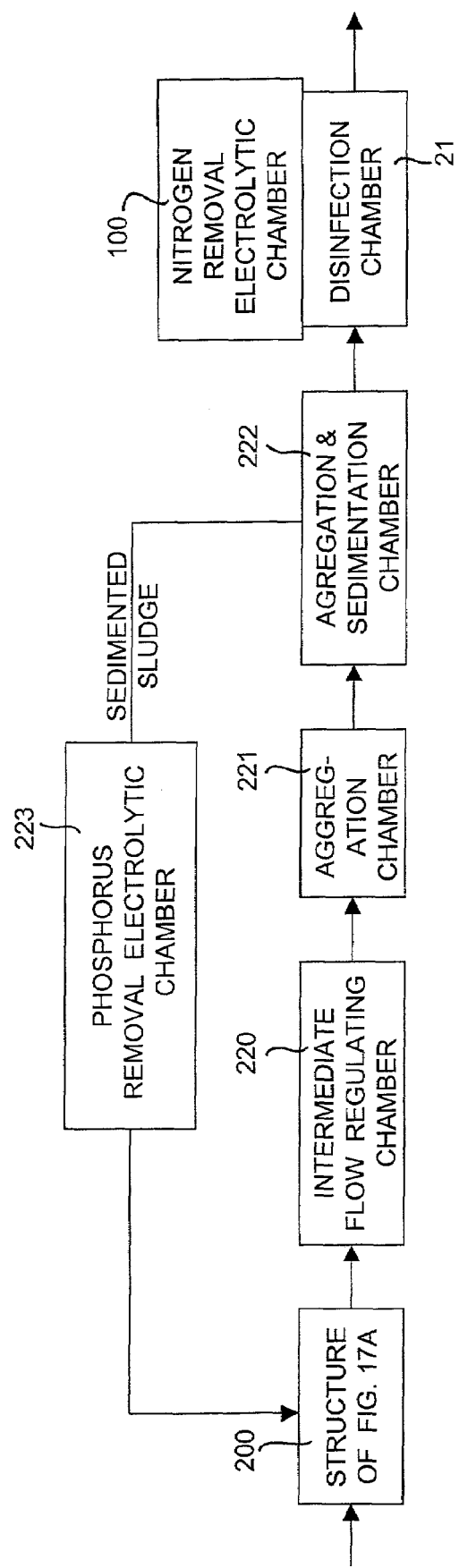

The final stage of the treatment in tank 1 is preferably treatment in disinfecting chamber 21. Therefore, electrolytic chamber 100 and nitrogen removal chamber 100A are preferably located upstream of disinfecting chamber 21. However, electrolytic chamber 100 and nitrogen removal chamber 100A can also be located inside disinfecting chamber 21. When electrolytic chamber 100 is installed inside disinfecting chamber 21, the treatment process illustrated in FIG. 1 becomes the treatment process shown in FIG. 20(A), and the treatment process shown in FIGS. 17(B) and (C) becomes the treatment process illustrated in FIGS. 20(B), (C). Each of the processes shown in FIGS. 1, 17(B), and 17(C) are shown with electrolytic chamber 100 treatment conducted in disinfecting chamber 21.

In the embodiment described above, metal ions in electrolytic chamber 59 for phosphorus removal are provided by electrolysis. However, the electrodes of electrode pairs 51 and 52 can be iron or aluminum metal plates or can be electrodes in which conductors such as stainless steel or the like are coated with these metals. By using electrodes of conductive material covered with iron rather than iron plates, the electrodes can be made lighter, which is important. For example, in water treatment devices for phosphorus removal, such as in multi-person dwellings or pig farms, the replacement frequency of electrodes is preferably once every 3–4 months. Reducing the weight of the electrodes per unit surface area makes a large difference in the weight of units having multiple sets of electrodes. For example, in a water treatment system installed for a multi-person dwelling of 50 people which treats 10 m$^3$ of wastewater per day, 8 iron plates of around 1.5 kg are used as electrodes for phosphorus removal. In a water treatment device installed in a pig farm which treats 20–30 m$^3$ of wastewater per day, 32 iron plates of around 1.5 kg each would be used. A reduction in the weight of the electrodes would make the operation of changing electrodes easier.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A water treatment device comprising:
    a waterhousing;
    an electrode pair which is immersed in water inside said waterhousing for electrochemically treating nitrogen compounds in said water; and
    a disinfecting chamber located upstream of said electrode pair, wherein:
    one of said pair of electrodes for nitrogen treatment comprises a member selected from the group consisting of a conductive insoluble material, a conductive material coated with said conductive insoluble material, and carbon coated with said conductive insoluble material; and
    the other of said pair of electrodes for nitrogen treatment comprises a member selected from the group consisting of a conductor containing at least one element from group Ib or IIb of the periodic table; iron, and a compound containing iron.

2. A water treatment device comprising:
    a waterhousing; and
    an electrode pair which is immersed in water inside said waterhousing for electrochemically treating nitrogen compounds in said water, wherein:
    one of said pair of electrodes for nitrogen treatment is an anode electrode that comprises a member selected from the group consisting of a conductive insoluble material, a conductive material coated with said conductive insoluble material, and carbon coated with said conductive insoluble material;
    the other of said pair of electrodes for nitrogen treatment is a cathode electrode that comprises a member selected from the group consisting of a conductor containing at least one element from group Ib or IIb of the periodic table; and
    the one of said pair of electrodes for nitrogen treatment comprises a member selected from the group consisting of iron, and a compound containing iron.

3. A water treatment device comprising:
    a waterhousing;
    an electrode pair which is immersed in water inside said waterhousing for electrochemically treating nitrogen compounds in said water; and
    a disinfecting chamber located upstream of said electrode pair, wherein:
    one of said pair of electrodes for nitrogen treatment comprises a member selected from the group consisting of a conductor containing at least one element from group Ib or IIb of the periodic table, iron, and a compound containing iron; and
    the other of said pair of electrodes for nitrogen treatment comprises a member selected from the group consisting of iron, and a compound containing iron.

4. A water treatment device comprising:
    a waterhousing;
    an electrode pair which is immersed in water and inside said waterhousing for electrochemically treating nitrogen compounds in said water;
    an ion supplying electrode pair which supplies metal ions by electrolysis, wherein:
    one of said pair of electrodes for nitrogen treatment comprises a member selected from the group consisting of a conductive insoluble material, a conductive material coated with said conductive insoluble material, and carbon coated with said conductive insoluble material; and
    the other of said pair of electrodes for nitrogen treatment comprises a member selected from the group consisting of a conductor containing at least one element from group Ib or IIb of the periodic table.

5. A water treatment device comprising:
    a waterhousing;
    an electrode pair which is immersed in water inside said waterhousing for electrochemically treating nitrogen compounds in said water;
    a nitrogen compound ion quantity sensor which detects a total quantity of nitrogen compound ion in water brought into or discharged from said housing; and
    a current flow controller which controls current flow flowing between said electrodes of said nitrogen treatment electrode pair based on a detection output from said nitrogen compound ion quantity sensor, wherein:
    one of said pair of electrodes for nitrogen treatment comprises a member selected from the group consisting of a conductive insoluble material, a conductive material coated with said conductive insoluble material, and carbon coated with said conductive insoluble material; and
    the other of said pair of electrodes for nitrogen treatment comprises a member selected from the group consisting of a conductor containing at least one element from group Ib or IIb of the periodic table; iron, and a compound containing iron.

6. A water treatment device comprising:
    a waterhousing;
    an electrode pair which is immersed in water inside said waterhousing for electrochemically treating nitrogen compounds in said water;
    a nitrogen compound ion quantity sensor which detects a total quantity of nitrogen compound ion in water brought into or discharged from said housing; and a compound quantity controller which controls an addition amount of a compound which provides halogen ions in water based on a detection output from said nitrogen compound ion quantity sensor, wherein:

one of said pair of electrodes for nitrogen treatment comprises a member selected from the group consisting of a conductive insoluble material, a conductive material coated with said conductive insoluble material, and carbon coated with said conductive insoluble material; and the other of said pair of electrodes for nitrogen treatment comprises a member selected from the group consisting of a conductor containing at least one element from group Ib or IIb of the periodic table; iron, and a compound containing iron.

7. A water treatment device comprising:

a waterhousing;

an electrode pair which is immersed in water inside said waterhousing for electrochemically treating nitrogen compounds in said water; and a disinfecting chamber located upstream of said electrode pair, wherein:

one of said pair of electrodes for nitrogen treatment is an anode electrode that comprises a member selected from the group consisting of a conductive insoluble material, a conductive material coated with said conductive insoluble material, and carbon coated with said conductive insoluble material; and the other of said pair of electrodes for nitrogen treatment is a cathode electrode that comprises a member selected from the group consisting of a conductor containing at least one element from group Ib or IIb of the periodic table; iron, and a compound containing iron.

8. A water treatment device as defined in claim 7, wherein the one of said pair of electrodes for nitrogen treatment comprises a member selected from the group consisting of iron, and a compound containing iron.

9. A water treatment device comprising:

a waterhousing;

an electrode pair which is immersed in water inside said waterhousing for electrochemically treating nitrogen compounds in said water;

a nitrogen compound ion quantity sensor which detects a total quantity of nitrogen compound ion in water brought into or discharged from said housing; and a current flow controller which controls current flow flowing between said electrodes of said nitrogen treatment electrode pair based on a detection output from said nitrogen compound ion quantity sensor, wherein:

one of said pair of electrodes for nitrogen treatment is an anode electrode that comprises a member selected from the group consisting of a conductive insoluble material, a conductive material coated with said conductive insoluble material, and carbon coated with said conductive insoluble material; and the other of said pair of electrodes for nitrogen treatment is a cathode electrode that comprises a member selected from the group consisting of a conductor containing at least one element from group Ib or IIb of the periodic table; iron, and a compound containing iron.

10. A water treatment device comprising:

a waterhousing;

an electrode pair which is immersed in water inside said waterhousing for electrochemically treating nitrogen compounds in said water;

a nitrogen compound ion quantity sensor which detects a total quantity of nitrogen compound ion in water brought into or discharged from said housing; and a compound quantity controller which controls an addition amount of a compound which provides halogen ions in water based on a detection output from said nitrogen compound ion quantity sensor, wherein:

one of said pair of electrodes for nitrogen treatment is an anode electrode that comprises a member selected from the group consisting of a conductive insoluble material, a conductive material coated with said conductive insoluble material, and carbon coated with said conductive insoluble material; and the other of said pair of electrodes for nitrogen treatment is a cathode electrode that comprises a member selected from the group consisting of a conductor containing at least one element from group Ib or IIb of the periodic table; iron, and a compound containing iron.

11. A water treatment device comprising:

a waterhousing;

an electrode pair which is immersed in water inside said waterhousing for electrochemically treating nitrogen compounds in said water; and a disinfecting chamber located upstream of said electrode pair, wherein:

one of said pair of electrodes for nitrogen treatment is an anode electrode that comprises a member selected from the group consisting of a conductive insoluble material, a conductive material coated with said conductive insoluble material, and carbon coated with said conductive insoluble material; and the other of said pair of electrodes for nitrogen treatment is a cathode electrode that comprises a member selected from the group consisting of a conductor containing at least one element from group Ib or IIb of the periodic table.

12. A water treatment device as defined in claim 2, further comprising a disinfecting chamber located upstream of said electrode pair.

13. A water treatment device comprising:

a waterhousing;

an electrode pair which is immersed in water inside said waterhousing for electrochemically treating nitrogen compounds in said water;

a nitrogen compound ion quantity sensor which detects a total quantity of nitrogen compound ion in water brought into or discharged from said housing; and a current flow controller which controls current flow flowing between said electrodes of said nitrogen treatment electrode pair based on a detection output from said nitrogen compound ion quantity sensor, wherein:

one of said pair of electrodes for nitrogen treatment is an anode electrode that comprises a member selected from the group consisting of a conductive insoluble material, a conductive material coated with said conductive insoluble material, and carbon coated with said conductive insoluble material; and the other of said pair of electrodes for nitrogen treatment is a cathode electrode that comprises a member selected from the group consisting of a conductor containing at least one element from group Ib or IIb of the periodic table.

14. A water treatment device comprising:

a waterhousing;

an electrode pair which is immersed in water inside said waterhousing for electrochemically treating nitrogen compounds in said water;

a nitrogen compound ion quantity sensor which detects a total quantity of nitrogen compound ion in water brought into or discharged from said housing; and a compound quantity controller which controls an addition amount of a compound which provides halogen ions in water based on a detection output from said nitrogen compound ion quantity sensor, wherein:

one of said pair of electrodes for nitrogen treatment is an anode electrode that comprises a member selected from the group consisting of a conductive insoluble material, a conductive material coated with said conductive insoluble material, and carbon coated with said conductive insoluble material; and the other of said pair of electrodes for nitrogen treatment is a cathode electrode that comprises a member selected from the group consisting of a conductor containing at least one element from group Ib or IIb of the periodic table.

* * * * *